Patented June 7, 1927.

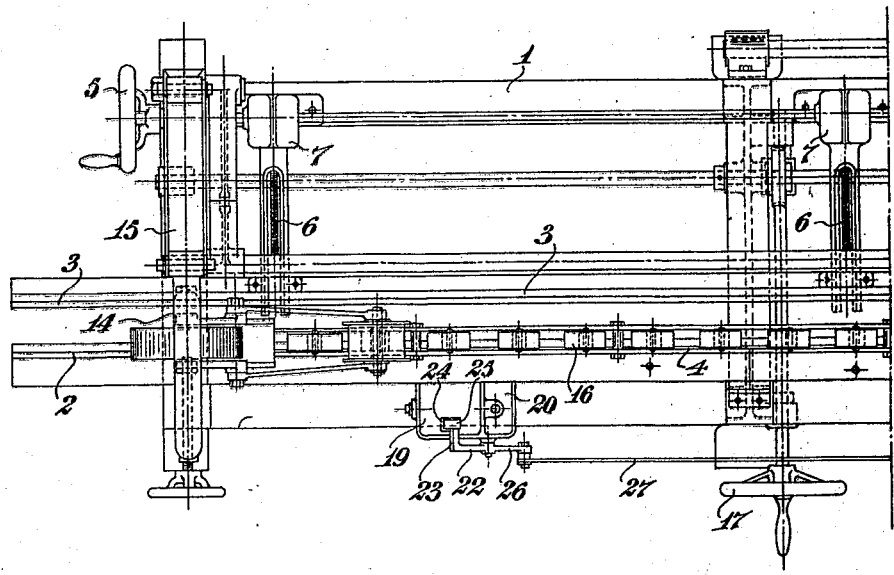
Fig. 2.
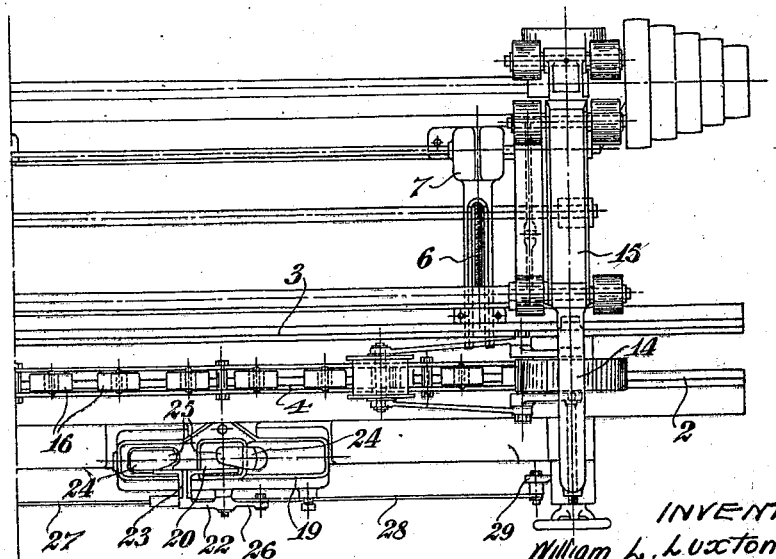
INVENTORS
William L. Luxton
William A Green

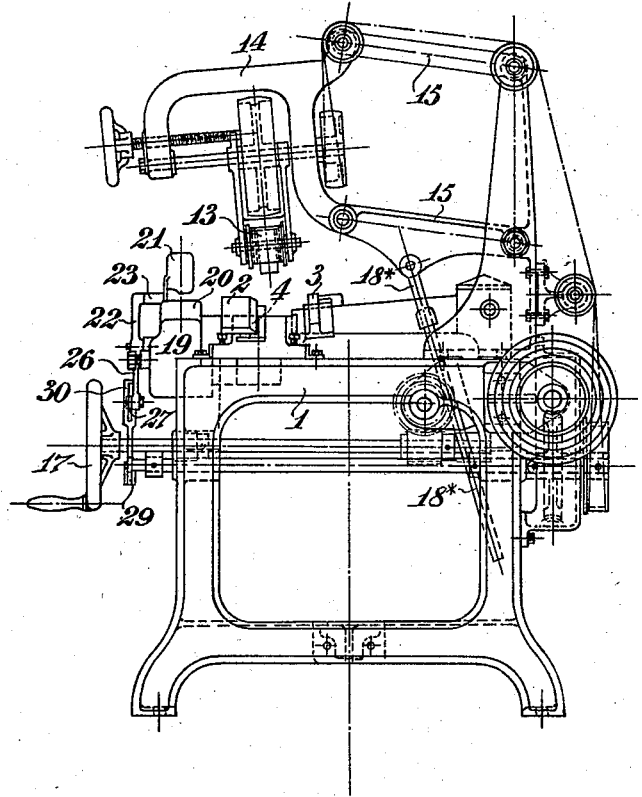

1,631,424

UNITED STATES PATENT OFFICE.

WILLIAM JOHN LUXTON AND WILLIAM AHIRA GREEN, OF LONDON, ENGLAND.

CAN-SOLDERING MACHINE.

Application filed December 16, 1926, Serial No. 155,221, and in Great Britain October 20, 1925.

This invention relates to can-soldering machines wherein cans are moved across a framework with their peripheral edge or other seam to be soldered dipping successively in or travelling on top of flux and solder troughs or slots. In some machines circular section cans are rolled along the framework whilst they are canted so that their lower edge runs in the troughs, and in other machines cans of prismatic section, as they travel across the machine, are toppled from one flat side to another, so that the edges dip in sequence into the open baths of flux and molten solder. Other machines are of the type wherein the seam travels along the top of a solder slot where a fine elongated bead of solder is applied to the seam by capillary attraction. As examples of the foregoing machines which we have in mind, there might be mentioned those described in our prior British specifications Nos. 195,129 and 215,233, and in Gilkes' and another's British specifications Nos. 15,227 and 17,762 both of 1915.
The present invention has for its object to provide improved means for feeding molten solder to the solder trough. It relates to the type of device (as in Gilkes' patents) wherein an oscillating ladle or dipper lifts solder from a low-level supply well to a high-level well associated with a level-adjusting valve whereby the level of the high well is maintained at a requisite height corresponding with the required level in the trough or solder slot which is fed from the high well. Excess level in the high well overflows back into the low well.

According to the said invention, the pivoted rocking arms which carry the oscillating ladles are connected by a loose connection to an operating element (e. g. a connecting rod attached to and actuated by a crank) whereby the said operating element moves the rocking arms under normal working conditions, but rides free of the former when abnormal resistance, as will be explained later, is encountered.

The accompanying drawings show a mode of execution, by way of example, and in said drawings:—

Figure 1:
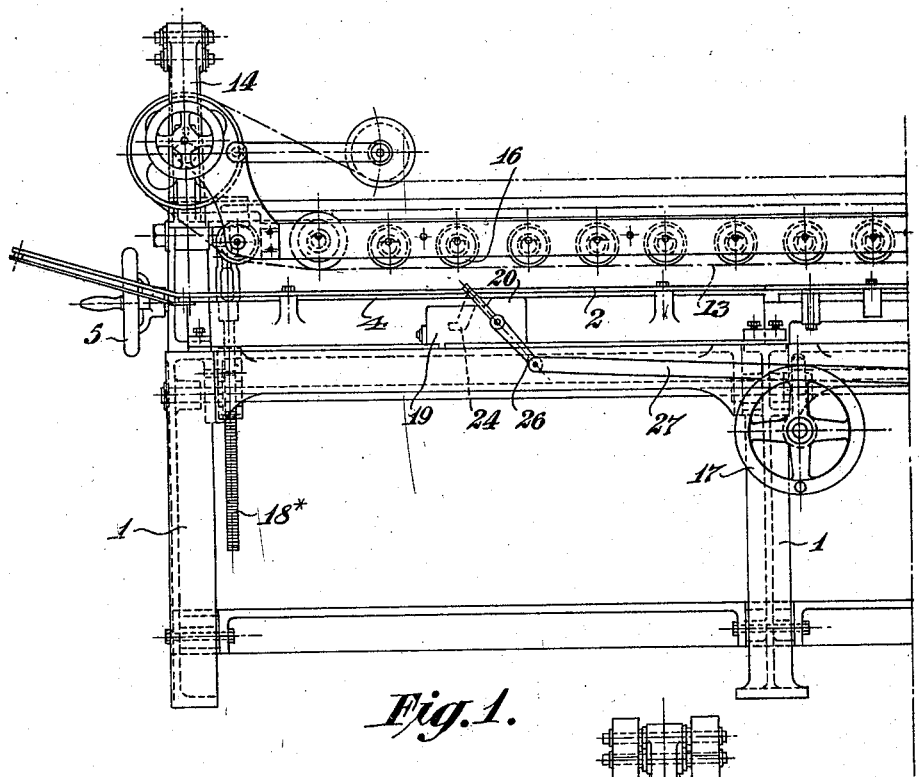
Figure 1:
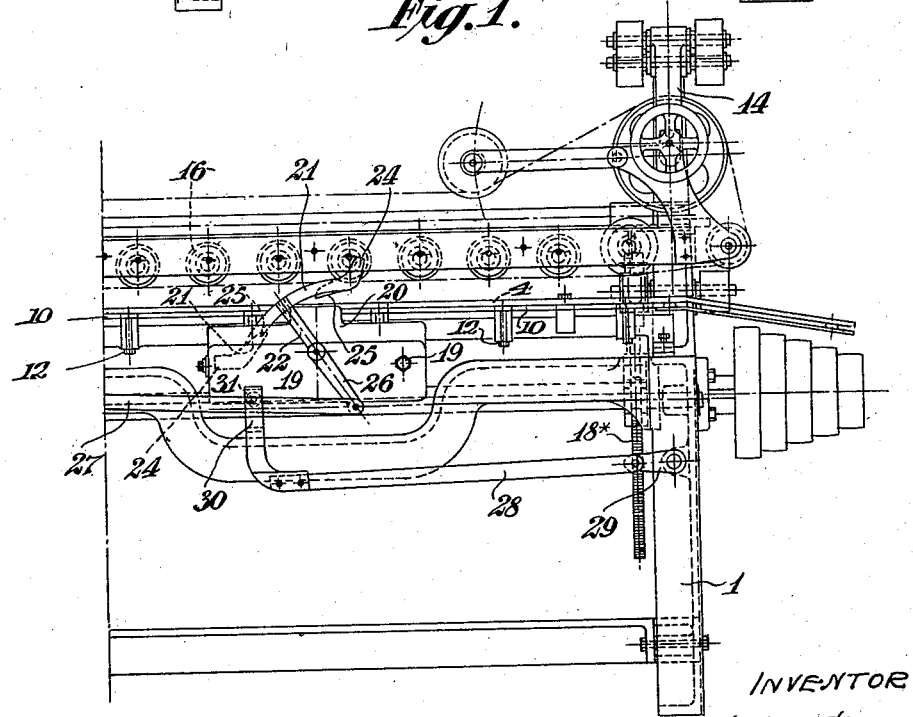

Figure 1 is a front elevation;
Figure 2 is a plan;
Figure 3 is an end view; and,
Figure 4 is an enlarged cross-section of the solder or flux bead.

The machine comprises a stand 1 having a substantially horizontal bed with a front track 2 and a rear track 3 along which the cans are rolled. The end of the can rests against the front track 2 whilst the peripheral edge or any other intermediate seam on the cylindrical can runs along the mouth of the bead-forming device 4 (Figure 4) which extends longitudinally along the machine and is in connection with the trough or slot 18. The back track 3 can be moved near to or away from the front track 2 according to the length of can. This movement is effected by rotating the hand-wheel 5, which rotates the threaded shafts 6, through bevel gears in the gearboxes 7, see Figure 2. The beading device 4 is in two separate sections, one part on the entry side (left of Figures 1 and 2) being for flux for soldering, and the right side for solder, as is known.

The two angle members 8 and 9 forming the feeding slot for beading device 4 (Figure 4) are removably fitted by clamping lugs or elongated angle bars 10 and 11 held by studs 12.

The cans are caused to travel across the tracks 2 and 3 and along the mouth of the slot of the beading device 4 by a travelling band 13 carried by end frameworks 14, 14 supported by a parallel linkage 15 whereby the belt 13 can be raised or lowered according to the diameter of the cans. Loose jockey rollers 16 press the band down. The solder in the feeding slot of the beading device 4 forms an upstanding bead which is conveyed to the can seams by capillary attraction, after the same have been coated with flux from the left-hand beader 4 in the same manner, as the cans roll along. The belt frames 14, 14 are raised and lowered by the hand-wheel 17, operating the raising and lowering racked rods 18ˣ (Figures 1 and 3) through suitable gearing.

According to the embodiment (see Figure 1), the low-level well 19 is preferably a metal casting formed with an independent compartment 20 constituting the high-level well. The oscillating ladle 21 is fixedly mounted on a rocking arm or lever 22. The latter (22) is pivoted on the exterior of the casting to swing in a vertical plane, and its upper extremity is right-angularly or otherwise bent inwards at 23 to overhang the open top of the double-well casting 19—20. In the vertical position (or substantially so) the overhang part 23 is above the high well 20, whilst in the inclined position, say downwards to about 45 degrees as illustrated, the overhanging part 23 clears the high well 20 and is above the low well 19. On said overhanging part is fixed a ladle or dipper 21 extending downwards and inclined outwards from the said part 23, so that as the rocking arm 22 leaves the vertical, the ladle 21 is plunged into the solder at the low well 19, and as it approaches the vertical the ladle of solder is emptied into the high well 20. The ladle is preferably shaped with a hollowed hooked toe 24, the hollowed toe leading to a channelled body of the ladle open at the end 25 near the overhanging part 23 of the rocking arm, so that the solder flows from the scoop or hooked toe 24 along the channel to be emptied into the high-level well 20. A pair of such ladles may be mounted on the overhanging arm in general inverted V-disposition, or curved, as in the right-hand unit of Figures 1 and 2, so that the feed is double-acting, one side emptying whilst the other is dipping. The foregoing applies to the flux supply as well as to the solder supply.

It forms a feature of the said invention that the following fool-proof mode of actuation is employed. That is to say, the invention takes into account the fact that the machine may be started up whilst the solder in the low-level well or wells 19 is set hard with or without the ladle 21 being fixedly embedded therein according as the machine was left overnight. Without means to allow for such a contingency, it is probable that one or other of the components would fracture.

The rocker arm 22, and consequently the ladle or ladles are operated as follows:—
There may be one ladle device for the solder supply and one for the flux. The tails 26 of both rocker arms are joined together by a flat bar 27 extending horizontally across the front of the machine and pivoted at each end to said tails 26. This bar is reciprocated by means of a connecting rod 28 extending from a suitable point intermediate of the length of the bar 27 to a crank or equivalent 29 at one side of the machine actuated by suitable gear from a shaft of the gearing employed to work the travelling mechanism for the cans.

The joint of the connecting rod 28 to the said horizontal bar 27 is a loose pivot 30. That is to say, a pivot stud, pin, roller or equivalent 31 carried by an extension of the connecting rod loosely drops into a half-round or other suitable recess on the top edge of the horizontal bar 27. Such a joint is firm enough in all normal circumstances to transmit movement from the connecting rod 28 to the bar 27, but if for any reason the movement of the latter is jammed, then the pivot stud 31 rides out of the recess and works idly along the bar 27. An equivalent action could be obtained by slotting the bar 27 longitudinally, and recessing one of the edges of the slot to accommodate the pivot stud 31.

We claim:—

1. In a can soldering machine of the type wherein solder is elevated from a low well to a high well, a plurality of ladle devices for lifting the solder from a low well to a high well, pivoted arms carrying said ladle devices, a reciprocable member connecting said arms, a reciprocating connecting rod, and a loose connection between said rod and said member whereby the latter is moved by the former under normal working conditions, but rides free thereof when abnormal resistance is encountered by the ladles.

2. In can soldering machines of the type set forth, the combination of pivoted rocking arms, ladles carried by said arms, a bar connecting the ends of said rocking arms opposite the ladles, and an actuating rod for said bar operated by a crank, a member carried by said connecting rod and engaging in a depression in said bar to normally connect the rod and bar by permitting them to move separately when the ladles encounter abnormal resistance.

In testimony whereof we have affixed our signatures hereto this 22nd day of November, 1926.

WILLIAM AHIRA GREEN.
WILLIAM JOHN LUXTON.